Nov. 21, 1961 R. J. PURTELL 3,009,646
IRRIGATION PIPE MOVING SYSTEM
Filed Sept. 11, 1958 2 Sheets-Sheet 1
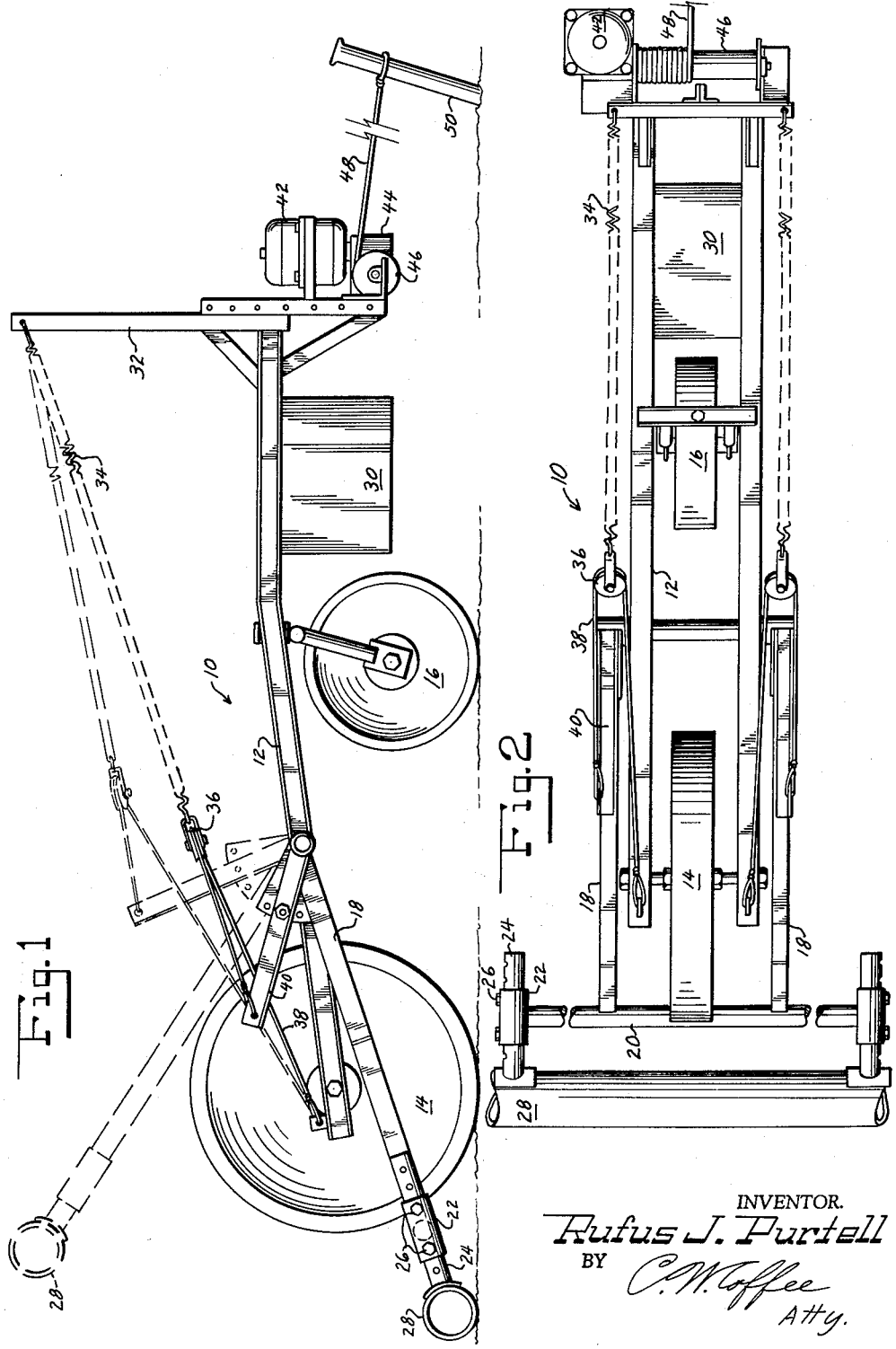
INVENTOR.
Rufus J. Purtell
BY C. W. Coffee
Atty.

Nov. 21, 1961 R. J. PURTELL 3,009,646
IRRIGATION PIPE MOVING SYSTEM
Filed Sept. 11, 1958 2 Sheets-Sheet 2
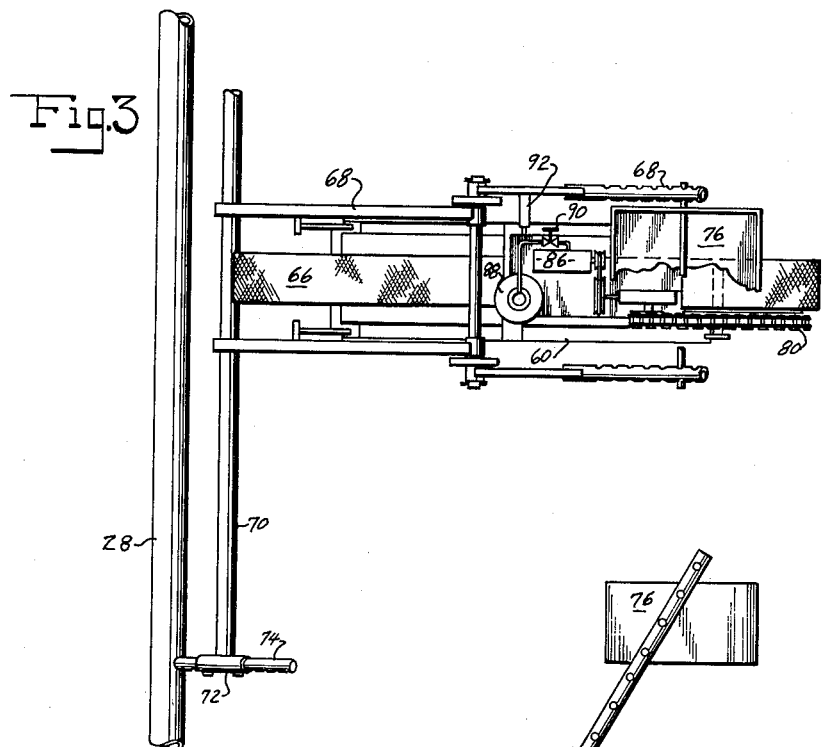
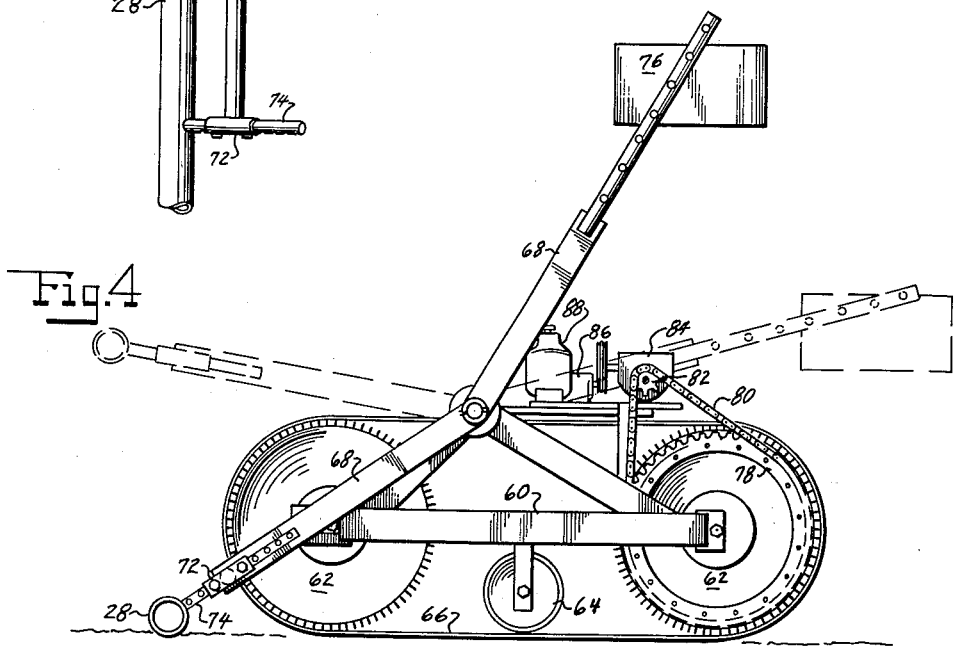
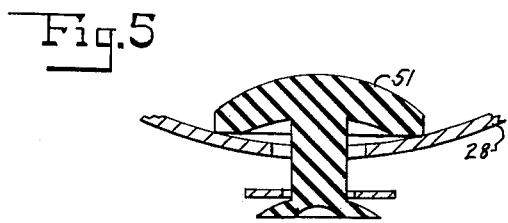
INVENTOR.
Rufus J. Purtell
BY
Atty.

3,009,646
IRRIGATION PIPE MOVING SYSTEM
Rufus Judson Purtell, P.O. Box 447, Brownfield, Tex.
Filed Sept. 11, 1958, Ser. No. 760,469
10 Claims. (Cl. 239—189)

This invention pertains to agricultural sprinkler irrigation systems and, more particularly, to the problem of moving pipes in such system.

Much of the agricultural irrigation performed today is done by sprinkler systems wherein aluminum pipe is spread for a considerable extent, up to 440 yards across a field with sprinklers spaced at regular intervals along such pipe. After one land has been irrigated, it is necessary to move the pipe to a new location to irrigate a second land. Mechanisms as disclosed by Boice in U.S. Patent 2,711,615 and Dick et al. in 2,800,364, have been invented to move the pipe. However, it is still customarily moved by hand. The hand moving the pipe to the new location is a disagreeable job. Not only does the pipe have a certain amount of weight, but as it is generally moved from a freshly irrigated place, the land is particularly muddy and therefore difficult to walk in.

The previous devices and mechanism which have been designed to do this job all have a common failing. In every instance of which I am aware, the pipe is supported at an elevation above the ground at all times. It is necessary to have the pipe elevated when it is being moved. Otherwise, it would damage growing crops and, in general, be difficult to drag around. However, it is not necessary to have the pipe elevated during the time the sprinkler system is in operation.

I have invented a system wherein the pipe is on the ground when the sprinkler is in operation but the pipe is raised when being moved. This is easily accomplished because the pipe is normally provided with valves which automatically open to release the water in the pipe when the pressure is released. The principal weight of the pipe when full is due to the water. Therefore, when the water has been released from the pipe, the pipe has very little weight to be supported in a raised position and therefore greater spans are possible between the vehicles which move the pipe.

In the complete system I have invented, I also provide a novel motive power means for the vehicles. This comprises a system of stored energy on the vehicles themselves. This stored mechanical energy may be in the form of liquefied petroleum gases. It could be in the form of air which has been compressed by means of the available energy in the water pipe when the system is sprinkling. I.e., the system includes a water motor which compresses air while sprinkling; when the sprinkler is shut off, the stored energy is used to drive the vehicles forward.

Another object of this invention is to provide a system for moving irrigation pipe.

Another object of this invention is to provide a system whereby the pipe is on the ground when it is full of water and is elevated above the ground when it is empty in the process of being moved to a new location.

A further object of this invention is to provide a motive power for vehicles used in moving irrigation pipe.

Still further objects are to achieve the above with a device that is sturdy, compact, simple and reliable, yet cheap and easy to manufacture.

The specific nature of the invention as well as other objects, uses, and advantages thereof will clearly appear from the following description and from the accompanying drawing, in which:

FIG. 1 is an elevational view of a device according to this invention.

FIG. 2 is a plan view of the device of FIG. 1.

FIG. 3 is an elevational view of a modified form of the invention.

FIG. 4 is a plan view of the device of FIG. 3.

FIG. 5 is a detail of the valves in the pipe.

As may be seen in the accompanying drawings, FIGS. 1 and 2, one embodiment of this invention makes use of a bicycle-type vehicle 10.

The vehicle has frame 12 which connects main wheel 14 and caster wheel 16. The caster wheel balances the vehicle. Journaled across the frame about an axis parallel to the axis of the main wheel is a pair of pipe arms 18. The axis about which the pipe arms are journaled is between the main wheel and the caster wheel. The pipe arms straddle or extend on either side of the frame. Cross member 20 extends across the extreme end of the pipe arms parallel to the aforementioned axes. On either end of the cross member or beam there are tubes 22 which are generally parallel to the pipe arms. These tubes have a plurality of diametrical holes. Rods 24 are slidingly connected within the tubes. The rods likewise have a plurality of holes diametrically therethrough and aligned with the holes in the tube. Pins 26 secure the rods in a selective position within the tubes and in a selective position relative to the pipe arms and the vehicle itself. The other end of the rods are attached to irrigation pipe 28 itself.

Ballast box 30 is on the forward end of the vehicle frame, i.e., the end opposite from the position of the irrigation pipe. The box may contain earth or other material. The purpose is to prevent the vehicle from overturning when the pipe is raised. Two upright standards 32 are also on the forward end of the frame. There are a plurality of holes in each upright standard through one of which is connected a helical tension spring 34. The other end of the helical tension spring is attached to pulley 36. One end of cable 38 is attached to the frame, reaved through the pulley, and the other end is attached to leg 40 which is adjustably attached to the pipe arm.

The tension of each spring is adjusted so that when there is no water in the pipe, the pipe will be elevated to a position as seen in the broken lines. However, if there is water in the pipe, the weight will overcome the tension of the spring so that the pipe is in the lower position, as seen in full lines. Electric motor 42 is attached to the forward end of the frame. Through a suitable gear box 44 it is drivingly connected to windlass 46. Line 48 is wound around the windlass and extended forward to stake 50 which is driven in the ground. When the electric motor rotates, it will wind in the line pulling the vehicle toward the stake.

In operation the cycle will be described from the time that the pipe is on the ground and full of water under pressure and the system sprinkling. When the land upon which the system is located has been irrigated to the extent desired, the pressure on the pipe is released by turning off the pump which supplies pressure to the system. This will cause the opening of valves 51 (FIG. 5) which are conventionally in the pipe and which are well known to the art, allowing the water in the pipe to be released. As the water leaves the pipe, this decreases the total weight of the pipe and its contents. The tension of the springs acting through the pulley and cable system will raise the pipe from the ground to an elevated position. After this, the electric motors on each of the several vehicles may be energized by a single switch located at some convenient point. The wiring for the motors has not been shown as Boice has suggested mounting electric motors on vehicles for moving agricultural irrigation systems and it is believed that this has been sufficiently taught without recitation here. As the motors have been energized they begin to rotate, which turns the windlass which moves the cable which draws the vehicle toward the stakes. All the vehicles will move uniformly and in line provided the electric motors turn to the same speed which they will, this being characteristic of electric motors. When the vehicles carrying the pipe with them have reached the desired new location, the switch to the lines to the motors is opened, causing all the vehicles to stop. Then, water under pressure is introduced into the pipe. The water under pressure will close the valves 51. As the pipe fills with water, the weight of the water will overcome the tension of the spring, causing the pipe to return to its position on the ground. As the pressure builds up, the sprinkler system begins to operate, thus completing the cycle.

FIGS. 3 and 4 illustrate another form of the invention. In the modified form a track laying vehicle is employed. Like the bicycle type, it has a frame 60. On either end of the frame is journaled a wheel 62. Intermediate of the forward and aft wheel are located one or more bogie wheels 64. A tread 66 or endless belt of canvas or other material is attached around the two main wheels and under the bogie wheels as is well known to the art of track laying vehicles. For example, see Boice. Journaled to the frame about an axis which is parallel to the axis of all the wheels are a pair of pipe arms 68. The pipe arms carry at one end a cross member 70 with tubes 72 within which are rods 74 as heretofore described. The pipe arms extend forward and upon the opposite end from wherein the tubes and cross members are attached there are a plurality of holes. A ballast box 76 is mounted by means of these holes on the forward end of the pipe arms. The ballast box operates in the same manner as the spring system in the previous described embodiment.

Sprocket 78 is on the forward main wheel, driven by chain 80 which also extends around a sprocket 82 extending from the gear box 84. Compressed gas motor 86 supplies the power for the gear box. The driving force for the compressed gas motor is provided by liquefied petroleum gas (L.P.G.) which is contained within cylinder 88.

Although this gas is normally used as a fuel for combustion, I prefer to use it as mechanical energy as any other compressed gas would be used. Although this means that an inflammable material is exhausted from the motors, little hazard is involved. There is not a source of ignition at the point of escape and if ignition did occur, there is no other highly inflammable material in the area to cause difficulty or damage. The cylinder containing the L.P.G. is provided with a regulator valve which provides a constant pressure at the outlet side. Within the line which connects the cylinder to the motor there is a lever actuated valve 90 which is normally spring biased to the closed position. However, the end of the lever is positioned so that it is adapted to be actuated by projection 92 which is located upon the ballast end of the pipe arms 68. When the pipe arms reach the raised position, the projection will actuate the valve which will cause the gas to be fed to the motor, driving the vehicle forward. When it reaches its desired position, water is again introduced into the pipe which causes the pipe to move to the lower position, thus closing the valve and stopping the vehicle. Of course, other mechanisms could be provided to actuate the valve, particularly in the cutoff position. I.e., it might be desirable to have another valve in the line to cut the gas off after the vehicle has travelled a certain time or distance.

It is also contemplated that the energy within the pipe could be utilized to generate other energy which would be stored upon the vehicle until the time it would be needed. I.e., a water turbine could be introduced into the pipe which would turn a generator generating direct current electricity similar to that shown in Dick, et. al. This direct current electricity could be stored in batteries until a time when an electric motor on the vehicle would utilize electricity. Another system would be to have water motors operate an air compressor which would compress atmospheric air to a higher pressure. Then this compressed air could be used in compressed air motors at the time the vehicle was moved.

It will be apparent that the embodiments shown are only exemplary and that various modifications can be made in construction, materials, and arrangement within the scope of the invention as defined in the appended claims.

I claim as my invention:

1. In an agricultural irrigation system having an elongated pipe adapted to carry water under pressure, and means attached to said pipe for draining the contents of said pipe, said means for draining being responsive to the pressure in the pipe, the improvement comprising: a plurality of vehicles for moving said pipe, each vehicle having attached thereto means for attaching said pipe to said vehicle, and each vehicle having means for urging the pipe to an elevated position, so that when the pipe is empty it is elevated but the weight of the water in the pipe when full will overcome the means for urging, and one vehicle has means for driving attached thereto, the actuation of the means for driving responsive to the position of the pipe.

2. An agricultural irrigation system comprising a plurality of sprinkler pipe supporting vehicles, a pipe supporting arm connected to each vehicle and pivoted thereon upon a horizontal axis between a non-irrigating and an irrigating position, an elongated sprinkler pipe secured to each supporting arm, and means on each vehicle normally biasing said supporting arm and said pipe in the non-irrigating position when said pipe is empty, pressure actuated valve means in said pipe normally open when said pipe is in non-irrigating position and closed when water is admitted to said pipe under pressure whereupon the combined weight of said pipe and the water overcomes said biasing means to move said pipe to said irrigating position.

3. An agricultural irrigation system as in claim 2 and having vehicle drive means on said vehicle actuated by said pipe supporting arm when said pipe supporting arm moves to the non-irrigating position to transport said pipe from one location to another.

4. An agricultural irrigation system as in claim 2 and having vehicle drive means on said vehicle actuated by said pipe supporting arm when said pipe supporting arm moves to the non-irrigating position to transport said pipe from one location to another, and wherein said vehicle drive means comprises a compressed gas driven motor.

5. An agricultural irrigation system as in claim 2 and having attached to said vehicle means for driving said vehicle, and means associated with said drive means for actuating said drive means from a remote source.

6. An agricultural irrigation system as in claim 2 and having means for driving the vehicle attached to said vehicle actuated by said pipe supporting arm when said pipe supporting arm moves to non-irrigating position to move said pipe from one location to another and said pipe supporting arm having means attached thereto for cutting off said drive means when said pipe supporting arm is lowered to irrigation position.

7. An agricultural irrigation system as in claim 2 and having driving means for said vehicle including a motor drivingly connected to a windlass, and a line wound around the windlass and attached to a stake in the ground.

8. An agricultural irrigation system as in claim 2 and wherein said vehicle has a frame, an upward standard attached to said frame, a leg attached to said pipe supporting arm, and a tension spring connected from the upright standard to said leg.

9. An irrigation system comprising: an elongated pipe adapted to carry water under pressure, said pipe resting on and supported by the ground while watering; a plurality of vehicles each attached to said pipe for moving said pipe; means attached to the pipe for draining the contents of said pipe; and means operatively associated with the vehicles for raising the pipe to a height above the ground while moving the pipe, the means for raising the pipe being responsive to the weight of the pipe and the content.

10. An irrigation system comprising: an elongated pipe adapted to carry water under pressure, said pipe resting on and supported by the ground while watering; a plurality of vehicles each attached to said pipe for moving said pipe; means attached to the pipe for draining the contents of said pipe; and means operatively associated with the vehicles for biasing the pipe to a raised position above the ground, said means for biasing being so constructed that when the pipe is full of water that the weight of the pipe and contents overcomes the means for biasing but when the pipe is empty the means for biasing overcomes the weight of the pipe and raises same.

References Cited in the file of this patent

UNITED STATES PATENTS

| | | |
|---|---|---|
| 1,085,609 | Heath | Feb. 3, 1914 |
| 2,122,596 | Turner | July 5, 1938 |
| 2,250,227 | Kiel | July 22, 1941 |
| 2,719,653 | Bledsoe | Oct. 4, 1955 |
| 2,789,716 | Wolf | Apr. 23, 1957 |
| 2,889,948 | Leuenberger | June 9, 1959 |
| 2,946,515 | Jensen | July 26, 1960 |

FOREIGN PATENTS

| | | |
|---|---|---|
| 519,815 | Canada | Dec. 20, 1955 |